United States Patent Office 3,417,244
Patented Dec. 17, 1968

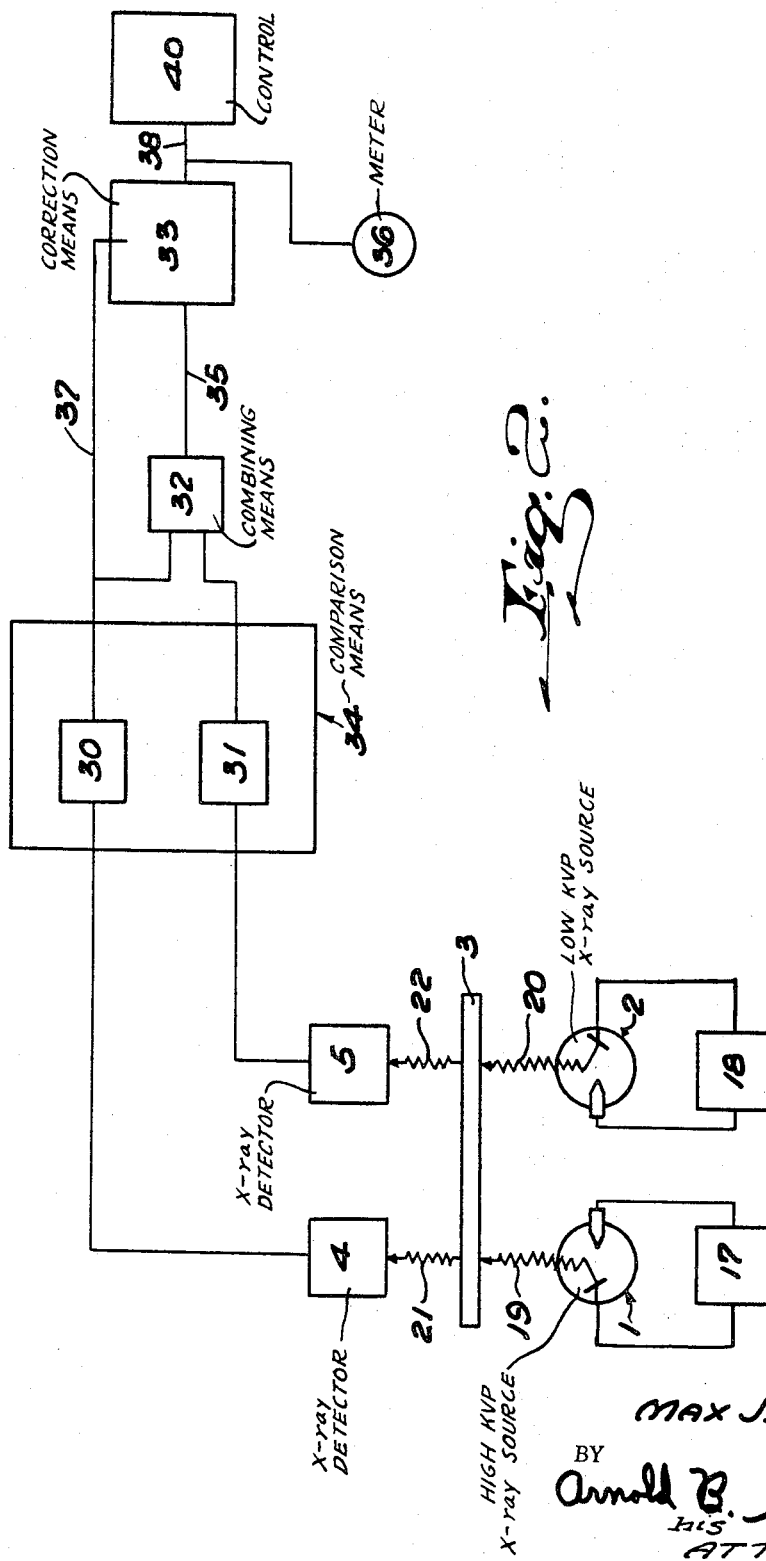

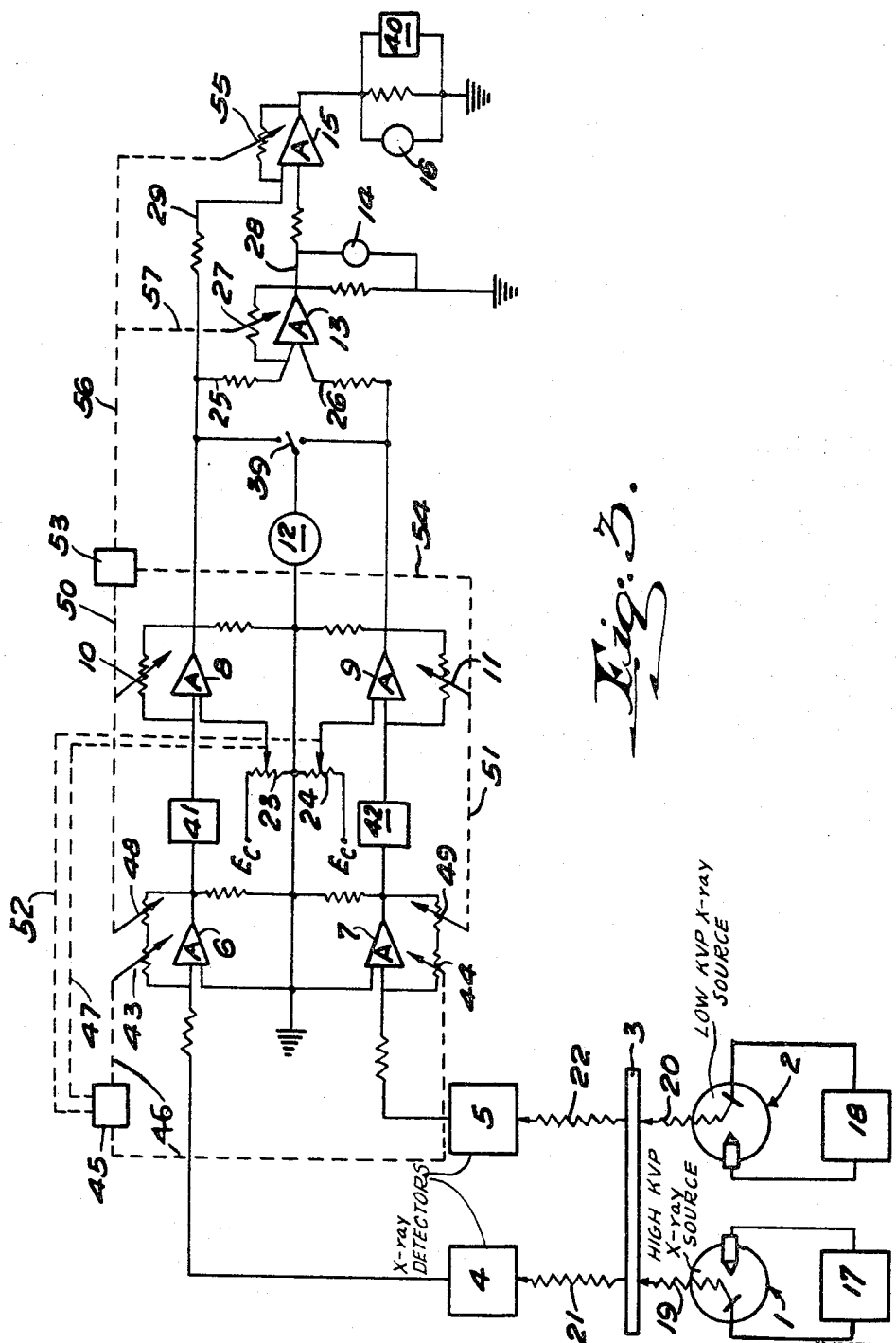

3,417,244
X-RAY THICKNESS GAUGE WITH CORRECTION FOR SPECIMEN COMPOSITION
Max J. Kramer, Parma, Ohio, assignor to Aluminum Company of America, Pittsburgh, Pa., a corporation of Pennsylvania
Filed Aug. 10, 1966, Ser. No. 571,477
7 Claims. (Cl. 250—83.3)

ABSTRACT OF THE DISCLOSURE

An apparatus for measuring the thickness of a metal specimen has two X-ray sources operating at different kilowatt peaks to emit X-ray beams of different wavelengths which are directed at the specimen, and the unabsorbed portions of the two beams are measured and compared to determine the deviation in specimen composition from that of a standard specimen, and to compute the thickness value corrected for alloy composition deviation.

---

This invention relates to the measurement of metal thickness and more specifically to a system employing X-ray absorption as a criterion for the measurement of variations in metal thickness while effectively isolating the effect of variations in metal composition.

It is well known that each atomic element absorbs X-ray energy in proportion to its atomic mass and transmits the remainder of the impinging energy. It is also known that higher absorption rates are attained with X-rays of lower kilovolt peak (kvp.), with a different rate for each element. If various portions of a metal specimen of given composition throughout are exposed to an X-ray source of constant kvp., a variation in absorption is related to a variation in specimen thickness. However, any metal specimen may have a small composition variation from location to location that will significantly affect X-ray absorption. For example, it may contain a larger proportion of a heavy metal constituent at one location, which constituent has an absorption power several times that of a lighter constituent, so that absorption of X-rays by the specimen at that location, if employed as an indication of specimen thickness, would yield an erroneous answer. A deviation from the normal absorption rate would be encountered and an erroneous measure of thickness obtained.

It is an object of this invention to provide a system for substantially continuous measurement of metal thickness while effectively eliminating or isolating the detrimental effects of variation in metal composition.

It is another object of this invention to provide a metal thickness measuring system which is adapted for use with a broad range of alloy compositions.

It is an additional object of this invention to provide a metal thickness measuring system which is adapted to simply and automatically provide a corrective control signal, representing true deviation from the standard thickness, to control means for a physical system to initiate a corrective change therein.

It is yet another object of this invention to provide a metal thickness measuring system employing a simultaneous multiple X-ray emission and absorption technique.

These and other objects of the invention will be more fully understood from the following description of the invention, on reference to the illustrations appended hereto, in which:

FIGURE 2 shows schematically apparatus illustrative of the invention;

FIGURE 3 shows a system that may be advantageously employed in accordance with the invention.

Figure 1:
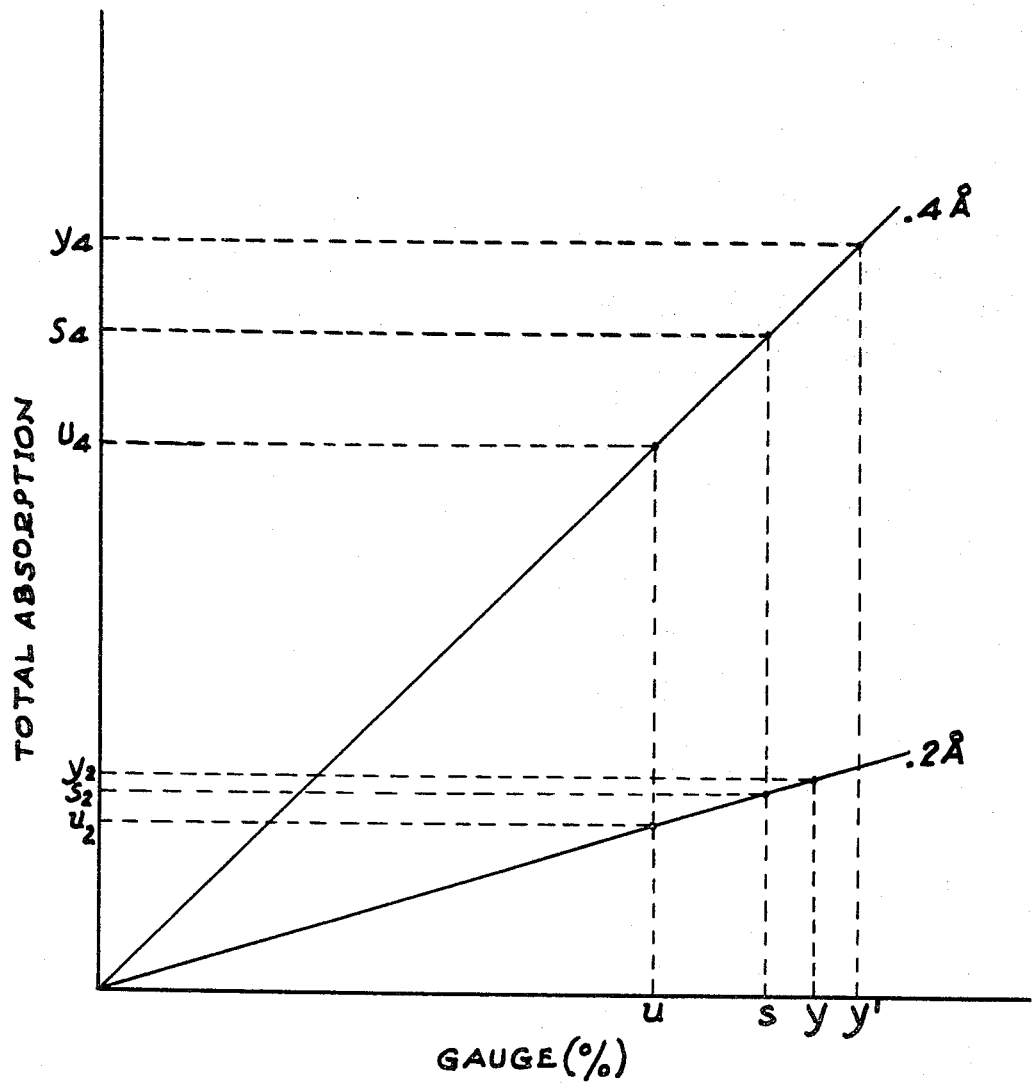
FIGURE 1 is a graphic representation of the relationship of X-ray absorption and gauge of metal for two kilovolt levels of X-rays, as may be employed in accordance with the invention.

It has been observed that for a given metal specimen, the absorption of X-rays varies markedly at different X-ray wavelengths. This fact permits the detection of variations in specimen composition by the generation of X-rays at two distinct wavelengths or spectra and measurement of the unabsorbed radiation which is transmitted through the specimen. While this general principle has been understood by others, such as Vossberg U.S. Patent No. 3,121,166, apparently no one has previously gone beyond the mere statement of the principle and provision of apparatus for meter indication of the different absorptions at different radiation wavelengths. I have found that I can advantageously make use of this principle in a system which is capable of automatically converting the two unabsorbed radiation signals into a signal representing the thickness of the specimen, with an automatic correction being made to correct for deviation from the selected or standard composition. I have found that the basis for this improvement is a relationship, believed previously unrecognized, between the indicated thickness or gauge difference at two frequencies and the gauge error induced by composition variations. Employing this relationship as a starting point, I have provided a system capable of being calibrated for various ranges of compositions expected to be encountered and adapted to provide an automatic correction signal which may be provided to a physical system, such as a rolling mill control system, for example, to produce corrective adjustments therein. I have discovered that, for a given selected composition, the relationship between (1) gauge error caused by variations in composition, and (2) the difference between the ratio of measured absorption at one wavelength or spectrum to the absorption at that wavelength or spectrum for the selected composition and the ratio of measured absorption at the second wavelength or spectrum to the absorption at that wavelength or spectrum for the selected composition is a constant. In other words, (a) $$\text{G.E.} = \left( \frac{U_2}{U_{2S}} - \frac{U_1}{U_{1S}} \right) Ka$$

where
G.E. equals gauge error induced by composition variation
$U_2$ equals the absorption by the unknown specimen at the second wavelength
$U_{2S}$ equals the absorption by the selected specimen at the second wavelength
$U_1$ equals the absorption by the unknown specimen at the first wavelength
$U_{1S}$ equals the absorption by the selected specimen at the first wavelength
$Ka$ equals the constant for the particular selected alloy.

As the values for $U_{2S}$, $U_{1S}$ and $Ka$ may be predetermined and the equipment calibrated accordingly, and the values $U_2$ and $U_1$ are measurable, this relationship permits determination of gauge error. It will be appreciated that, with this direct, constant relationship between gauge error and absorption, and with the use of a correction based thereon as discussed below, it is possible to provide means for employing the two absorption readings to automatically compute the error and produce a corrected true gauge value, which may conveniently be expressed either directly or in terms of percentage deviation from selected or standard gauge. Thus, the extent to which the indicated uncorrected gauge reading deviates from the actual gauge value due to alloy variation may be determined and the necessary correction applied to that uncorrected gauge reading so as to provide an accurate actual gauge value. The actual gauge may then be compared with the standard gauge, and a signal proportional to deviation from the standard gauge may be provided.

The X-ray absorption for each composition is directly related to the X-ray generator kvp. As the kvp. is directly proportional to frequency, it may readily be expressed in terms of frequency or translated into wavelength in angstroms. FIGURE 1 illustrates graphically an application of Formula (a) to a specific example. It shows a linearized approximation of the exponential relationship between total absorption and gauge with respect to two exemplary kvp.'s which have been converted to wavelengths for convenience of representation. As shown, the relationships of absorption to gauge are linear with the line for 0.4 angstrom having a greater slope than the corresponding line for 0.2 angstrom. As will be further explained hereinafter, it is the divergence of these two linear functions which affords the basis for a meaningful comparison of the two absorptions. Thus, for the selected specimen, having a thickness or gauge of the value $s$, the total absorptions at 0.2 and 0.4 angstrom are $s_2$ and $s_4$, respectively. Assume that an unknown specimen, whose thickness is to be compared with the selected specimen is exposed to X-ray energy at both 0.2 and 0.4 angstrom. Assume further that the 0.2 agnstrom beam yields an absorption reading of $y_2$, corresponding to an indicated gauge of $y$ and the 0.4 angstrom beam yields an absorption reading of $y_4$, corresponding to an indicated gauge of $y'$. The absorption readings $y_2$ and $y_4$ differ from the standard absorptions $s_2$ and $s_4$, respectively, and the corresponding indicated gauges $y$ and $y'$ differ from the selected or standard gauge $s$. This indicates the presence of error due to composition variations. The true gauge of the specimen must now be determined with correction for the error caused by different in composition. I have found that the algebraic correction required to determine the true gauge is directly proportional to the difference between the two indicated gauges $y$ and $y'$. This corrective term is negative when the indicated 0.4 angstrom gauge is larger than the 0.2 angstrom gauge, except when both $y$ and $y'$ are less than $s$, in which case the deviation is negative and the correction positive. The true gauge of the specimen, expressed in percent of standard gauge, may, therefore, be expressed as:

(b) $$G = 100\left[\frac{y}{s} - K\left(\frac{y'}{s} - \frac{y}{s}\right)\right]$$

Where G equals the relationship between the actual gauge expressed as a percent of selected or standard gauge and K is a proportionality constant. Thus, for a given pair of gauge measurements, the first term of the equation ($y/s$) represents the ratio of the indicated or measured gauge at the shorter wavelength compared to the standard gauge, and the second term represents a gauge correction based upon the deviation from selected or standard composition. It will be appreciated that, optionally, the measured gauge at the longer wavelength may be selected for correction in lieu of the measured gauge at the shorter wavelength.

It is obvious that the error in measured gauge $y$ in the foregoing example was caused by a variation in composition. This is so because a reading of a deviation from the standard gauge caused purely by a variation in actual gauge would result in each absorption yielding an identical gauge reading as both are penetrating the same specimen. This is true for absorptions $u_2$ and $u_4$ in FIGURE 1, both of which represent an actual gauge $u$. Thus, the actual gauge of the specimen is $u$ and it deviates from the standard gauge by $s-u$. In employing the above formula, the equation for actual gauge of the specimen, in percent of standard gauge, becomes:

(c) $$G = 100\frac{u}{s} - 100K\left(\frac{u}{s} - \frac{u}{s}\right) = 100\frac{u}{s}$$

and composition correction term $$100K\left(\frac{u}{s} - \frac{u}{s}\right)$$

drops out as it is equal to zero.

FIGURE 2 illustrates schematically a system for continuously and automatically inspecting specimens and providing a true gauge signal which has been corrected for variations in composition. A source of high kvp. X-rays 1 is operatively connected with automatic controlling means 17. Similarly, a source of low kvp. X-rays 2 is connected with automatic controlling means 18. A specimen 3, suitably in the form of a metal sheet-like member, is exposed to the adjacent X-ray beams 19, 20 emitted by sources 1, 2 respectively. Radiation detector 4 is calibrated to receive X-ray beam 21 which is the portion of beam 19 not absorbed by specimen 3. Radiation detector 5 is calibrated to receive X-ray beam 22 which is the portion of beam 20 not absorbed by specimen 3.

Detectors 4, 5 transmit signals proportional to X-ray beams 21, 22, respectively, to comparison means 34. Within comparison means 34, comparator 30 receives the signal emitted by detector 4 and comparator 31 receives the signal emitted by detector 5. Comparison of these signals with a selected or standard gauge and alloy composition is effected in each comparator for the respective kvp.'s. The output signals of the comparators 30, 31 represent gauge deviations from standard for the respective kvp.'s and are transmitted to combining means 32. A thickness correction signal is emitted by member 32 and carried to correction means 33 on lead 35. Correction means 33 also receives an uncorrected gauge deviation signal from comparison means 34 on lead 37. This signal may optionally be provided by either comparator, depending upon which signal is selected for correction. Correction means 33 modifies the uncorrected gauge signal by combining it with the thickness correction signal and emits a signal on lead 38, representing the true gauge as corrected for deviation of specimen composition from the selected composition. It will be appreciated that this signal may also be communicated to an automatic or semi-automatic equipment control means 40 to initiate a corrective adjustment, when appropriate, in a physical system, such as a rolling mill, for example. In this manner, the actual gauge as provided by continuous and automatic inspection of the specimens may conveniently be directly converted into a control signal in order to make the appropriate adjustment in the physical system. If a visual indication of this gauge is desired, a meter 36 or a recording instrument may be employed.

Referring back to Equation (b), it will be appreciated that the comparison means 34 has been calibrated with the selected or standard gauge and alloy composition, in order to provide terms $s$ and K, provides signals representing the ratios of $y'/s$ and $y/s$. Combining means 32 provides the difference between them, thus instantaneously providing a signal representing the term $$100K\left(\frac{y'}{s} - \frac{y}{s}\right)$$

The correction means 33 receives this term and corrects the $y/s$ term accordingly to yield the corrected gauge signal which may conveniently be expressed in terms of percentage deviation from standard gauge.

While in the discussion of underlying theory the relationship between the incident and transmitted X-ray energy was represented by a substantially straight portion of the curve, actually, over the length of straight line sector required for any one thickness setting, the selected segment may deviate from a straight line by a relatively small amount. In order to appreciate the nature of the approximation and its relative insignificance, consider, for a moment, the relationship between incident X-ray energy and transmitted X-ray energy through a metal specimen which may be expressed as (d)
$$I_T = I_i e^{-X(C)}$$

where
$I_T$ is transmitted energy
$I_i$ is incident energy
$e$ is 2.7183
X is mass, and
C is a mass absorption coefficient for a given composition In employing this formula in an effort to obtain a mathematical solution to the problem of effectively isolating composition variables in determining thickness variations it has been found necessary to employ two distinct X-ray beams. The exponential nature of the relationship expressed in Equation (d), however, makes meaningful comparison of the two absorption rates on the basis of this relationship impractical and burdensome, if not impossible. Yet, inspection of the exponential curve reveals desirable locations where the deviation from a straight line is insignificant. By proper selection of a short segment of the curve, the exponential relationship may be converted to a linear equation of the form $Y = -mx + b$, while retaining measurement sensitivity. By providing a suitable straight line plot for each kvp., proper transposition of the origin, and appropriate sign change, the negatively sloped straight line function may be converted to a positively sloped straight line which can be related to a gauge reading. An exemplary graphical representation of such a relationship is shown in FIGURE 1.

Turning now to FIGURE 3 which illustrates a detailed form of apparatus adapted for use with this invention, the specific circuitry of one suitable arrangement for comparison means, combining means, and correction means is shown. In this system, the signals emitted by receivers 4, 5 are received by amplifiers 6, 7. These amplifiers are provided with gain controls 43, 44 which are calibrated with respect to the expected range of deviation for at least one standard gauge and set with respect to the specific selected or standard gauge being measured. For convenience of setting the calibrated dials on the gain controls to the range of deviation from standard gauge, a master dial 45 shown connected to both controls 43, 44 by dotted line 46 may be employed. While the range of gauge deviation has been illustrated as being set by gain controls 43, 44 of amplifiers 6, 7, it will be appreciated that other means of adjusting the system for the contemplated range of deviation from standard may be conveniently employed. What is essential is that the system be set with information with respect to the particular standard gauge being inspected.

Where extreme sensitivity requirements make it desirable to eliminate the source of potential error, created by the approximation of the exponential incidence-transmission curve by a linear relationship, appropriate means may be provided. For example, in FIGURE 3, linearizing means 41, 42 having substantially the reverse curvature, in order to cancel the distortions and provide a linear output, are provided. Means 41, 42 each may conveniently be of the ladder filter type, where alternating current or pulsed direct current is employed in the system. It will be appreciated that other conventional linearizing means may also be advantageously employed. Amplifiers of a non-linear type, for example, may be employed. Where sensitivity requirements are such that the approximation is tolerable, means 41, 42 need not be provided.

Conventional differential style linear amplifiers 8, 9 are provided with gain control adjustments 10, 11 which are adjusted to provide amplifier gains corresponding to the standard composition for the specimen 3. Conveniently, the gain controls may be calibrated for a range of compositions and a dial provided to facilitate selection of a particular standard composition and rapid changeover to another standard composition. Optionally, these dials may be connected to a master dial 53 which will set the gain of both amplifiers 8, 9 to the particular standard composition with only one dial being turned. In FIGURE 3 these connections are indicated by dotted lines 50, 54. In the event it is contemplated that the apparatus will be employed with a number of different standard alloys, the calibration of the gain controls could be in terms of each individual element present in the alloys rather than total composition. Input cancellation means 23, 24 cooperate with amplifiers 8, 9 to provide an output which represents the deviation from standard gauge. These controls which are set to the selected or standard gauge being sought may conveniently be linked to master dial 45. With this arrangement, the setting of master dial 45 results in controls 43, 44 being set for the anticipated range of gauge deviation and input cancellation means 23, 24 being set to the specific selected or standard gauge in order that cancellation may be effected. These connections are shown by dotted lines 47, 52.

While master dial 45 may be calibrated so as to provide specific gauge and range of gauge deviation settings for input cancellation means 23, 24 and controls 43, 44, for each selected composition these functions may be performed separately. For example, as is shown in FIGURE 3, master dial 45 may establish a single range of gauge deviation for a particular specific gauge setting, regardless of composition. These range settings may be appropriately modified to reflect the appropriate range of deviation for the selected composition by means of composition controls 48, 49 which are connected to amplifiers 6, 7 and ganged to master dial 53 by the connections indicated by dotted lines 50, 51, respectively. Thus, for a specific selected gauge, the expected range of deviation for the composition selected may either be calibrated into master dial 45 or separately provided by inserting controls 48, 49.

Prior to operation of the system, with a standard specimen in position, the amplified receiver signal should be equal to a standard voltage when the master dials are properly set. In effecting this setting, indication switch 39 is placed in one position and then the other in order to verify that each output is zero. This indicates proper adjustment of the entire system.

While as was noted above the system may be operated to employ either the ouput of amplifier 8 or amplifier 9 as the uncorrected gauge signal to be corrected by the system, for purposes of illustration the correction is shown being applied to the output of amplifier 8. The uncorrected gauge signal from the high kvp. amplifier 8 is presented to alloy-error linear amplifier 13 by means of lead 25 and the gauge signal from the low kvp. amplifier 9 is presented to amplifier 13 by means of lead 26. Also fed into amplifier 13 is information from gain control 27 which contains information regarding the standard composition setting. This gain control 27 may conveniently be connected to a master dial 53 which sets gain controls 10 and 11. This connection is indicated by dotted lines 56, 57. In terms of Formula (a), the subtraction to obtain the difference between the ratios of the actual reading to the standard reading at each wavelength is effected by amplifier 13 which as a result of its gain control 27 then multiplies the difference by the appropriate constant, in order to emit a signal which is equal to gauge error induced by composition variation. The result is an amplified gauge error correction signal being provided on lead 28. Optionally, the uncorrected gauge meter 12 may be employed to give a visual indication of each signal and a visual indication of the gauge error correction may be provided by the insertion of meter 14 into the circuit.

The uncorrected gauge signal, in addition to being presented to amplifier 13 by means of lead 25 is also provided to corrected gauge amplifier 15 by means of lead 29. Amplifier 15 has gain control 55 which may conveniently be ganged to the master dial 53. The gauge error correction signal is also presented to corrected gauge amplifier 15 by means of lead 28. The output of this amplifier 15 is, therefore, the uncorrected gauge signal plus or minus the proper correction for error caused by deviation from standard composition. This may conveniently be visually observed by the insertion of meter 16 into the circuit and/or may provide a signal to the control means 40 of a physical system.

As a portion of the underlying theory contemplates the comparison of the divergence of two linear functions of distinct constant kvp.'s, the X-ray tube anode-cathode current should be carefully controlled as the X-ray intensity is directly related to this current. In order to maintain the desired high and low kvp. on the respective X-ray generators, controllers 17, 18 are provided. These controllers, by effective regulation of X-ray tube electrical properties such as anode-cathode voltage and cathode filament temperatures, maintain the desired X-ray tube anode-cathode current. While there are numerous means of effecting such control known to those skilled in the art and the selection of the particular means is not critical, it is essential that such controllers be provided.

While it is not essential to the effective use of this invention, that the X-ray beams be substantially monochromatic, there is a greater sensitivity to composition change in systems employing a narrow spectrum generator or a generator employing a constant voltage source. Methods of producing monochromatic X-rays such as by filters, prisms, and K-radiation with filters, for example, are well known in the art. Systems for producing bands of wavelengths by controlling X-ray tube voltage, beam intensity, beam density, target materials and others are also well known and may advantageously be employed in the system of this invention.

It will be appreciated that this invention provides an effective means of providing a continuous, accurate indication of the thickness of a specimen with an automatic correction for composition variations being effected. As the apparatus is adapted for continuous operation with simultaneous emission of two distinct X-ray beams, by generators disposed relatively close to each other, the apparatus may be employed to monitor a moving specimen such as a strip of metal, such as aluminum, which has passed through a rolling mill, wherein it is translated in a path which intercepts the X-ray beams. It will be also appreciated that the above-described apparatus provides the above-mentioned advantages while possessing simplicity of operation. After the operation of the system is initiated, no further switching, either manual or automatic is necessary. The system will provide the true gauge signal, which may advantageously be expressed as a percentage of the standard gauge and which can be supplied to a visual readout system and/or to a physical system or a controller of a physical system.

While throughout the discussion reference has been made to the portion of the X-ray beam "absorbed" by the specimen and measurement of "unabsorbed" portion thereof, it will be obvious to those skilled in the art that the relationship between the terms is such that they are complementary, i.e. the sum of both these quantities equals the total X-ray energy; the use of one term implies the equivalency of the total energy diminished by the other term. Where it has served the purpose of clarity of expression one term or the other has been employed.

Whereas particular embodiments of the invention have been described above for purposes of illustration, it will be evident to those skilled in the art that numerous variations of the details may be made without departing from the invention as defined in the appended claims.

What is claimed is:
1. A metal thickness measuring device, comprising, in combination,

(a) first and second X-ray beam generator means operating at different substantially constant kilovolt peaks adapted to simultaneously emit first and second X-ray beams which are adapted to impinge upon a metal specimen which absorbs portions thereof;
(b) first receiver means disposed opposite said first generator means adapted to receive the unabsorbed portion of said first X-ray beam and emit a signal proportional thereto;
(c) second receiver means disposed opposite said second generator means and adapted to receive the unabsorbed portion of said second X-ray beam and emit a signal proportional thereto;
(d) comparison means having a first comparator responsive to signals emitted by said first receiver means and a second comparator responsive to signals emitted by said second receiver means, each said comparator being calibrated with respect to at least one standard gauge and at least one standard composition and both being adapted to compare the signal received by it with said standard gauge and composition and emit a signal based upon said comparison; and
(e) combining means responsive to a signal emitted by each of said comparators to combine said signals and emit a thickness correction signal proportional to the deviation from said standard composition.

2. A thickness measuring device, comprising the metal thickness measuring device of claim 1 and correction means responsive to said thickness correction signal emitted by said combining means and an uncorrected thickness signal emitted by one of said comparators to provide a corrected thickness signal.

3. The thickness measuring device of claim 1 wherein each said comparator means contains a linear amplifier with gain proportioned in accordance with said standard composition.

4. The thickness measuring device of claim 1 wherein said combining means contains a linear amplifier adapted to receive signals emitted by each of said comparators and emit a thickness correction signal proportional to the deviation from said standard composition.

5. The thickness measuring device of claim 2 wherein said correction means contains a linear amplifier adapted to receive said thickness correction signal and an uncorrected gauge signal and emit a corrected gauge signal.

6. The thickness measuring device of claim 2 wherein linearizing means of substantially reverse curvature relative to the curvature of the signals emitted by said receiver means are provided.

7. The thickness measuring device of claim 4 wherein automatic controlling means for regulating the generator beam current of each said generator is provided.

References Cited

UNITED STATES PATENTS

| | | |
|---|---|---|
| 2,897,371 | 7/1959 | Hasler. |
| 3,010,018 | 11/1961 | Ziffer _____ 250—83.3 |
| 3,121,166 | 2/1964 | Vossberg. |
| 3,179,800 | 4/1965 | McNamara _____ 250—83.3 X |
| 3,210,545 | 10/1965 | Barnett _____ 250—83.3 |

RALPH G. NILSON, *Primary Examiner.*

A. B. CROFT, *Assistant Examiner.*

U.S. Cl. X.R.

250—52